(12) United States Patent
Hennessy

(10) Patent No.: US 11,333,207 B2
(45) Date of Patent: May 17, 2022

(54) SHAFT OUTPUT VISCOUS CLUTCH

(71) Applicant: Horton, Inc., Roseville, MN (US)

(72) Inventor: David R. Hennessy, Burnsville, MN (US)

(73) Assignee: HORTON, INC., Roseville, MN (US)

( * ) Notice: Subject to any disclaimer, the term of this patent is extended or adjusted under 35 U.S.C. 154(b) by 80 days.

(21) Appl. No.: 17/050,931

(22) PCT Filed: Mar. 26, 2019

(86) PCT No.: PCT/US2019/024003
§ 371 (c)(1),
(2) Date: Oct. 27, 2020

(87) PCT Pub. No.: WO2019/217001
PCT Pub. Date: Nov. 14, 2019

(65) Prior Publication Data
US 2021/0301884 A1    Sep. 30, 2021

Related U.S. Application Data

(60) Provisional application No. 62/668,997, filed on May 9, 2018.

(51) Int. Cl.
| F16D 35/02 | (2006.01) |
| F16D 48/06 | (2006.01) |
| F16D 127/00 | (2012.01) |

(52) U.S. Cl.
CPC .......... *F16D 35/024* (2013.01); *F16D 48/06* (2013.01); *F16D 2127/002* (2013.01);
(Continued)

(58) Field of Classification Search
CPC ........ F16D 35/02; F16D 35/024; F16D 48/06; F16D 1/096; F16D 2300/12;
(Continued)

(56) References Cited

U.S. PATENT DOCUMENTS

| 2,256,345 A | 9/1941 | Mart |
| 3,215,235 A | 11/1965 | Kamm |

(Continued)

FOREIGN PATENT DOCUMENTS

| CN | 201190592 Y | 2/2009 |
| DE | 3148872 A1 | 6/1983 |

(Continued)

OTHER PUBLICATIONS

International Search Report and Written Opinion issued in International Application No. PCT/US2019/024003, dated Jul. 9, 2019.

*Primary Examiner* — Richard M Lorence
(74) *Attorney, Agent, or Firm* — Westman, Champlin & Koehler, P.A.

(57) ABSTRACT

A viscous clutch includes a housing, an input device rotationally fixed to the housing, a rotor, a working chamber, a reservoir, a valve, and a quick disconnect bushing. The housing has a base, a cover, and a housing hub connected in in a rotationally fixed configuration. The input device is a pulley, a sprocket, and/or a gear. The rotor has a rotor disk and a rotor hub connected in a rotationally fixed configuration, and a central opening extends entirely through the rotor hub. The reservoir is carried by the housing and overlaps the input device in an axial direction. The quick disconnect bushing is removably secured to the rotor hub at the central opening and permits a rotationally fixed engagement between the rotor and an item driven by the clutch, such as an output shaft.

20 Claims, 5 Drawing Sheets

(52) U.S. Cl.
CPC .. *F16D 2250/0084* (2013.01); *F16D 2300/12* (2013.01); *F16D 2300/18* (2013.01); *F16D 2500/10418* (2013.01); *F16D 2500/10468* (2013.01)

(58) Field of Classification Search
CPC ....... F16D 2300/18; F16D 2500/10418; F16D 2500/10468; F16D 2500/30415; F16D 2500/30426; F16D 2127/002; F16D 2250/0084; Y10T 403/7056
USPC .............. 192/58.6–58.68, 103 R, 103 F
See application file for complete search history.

(56) References Cited

U.S. PATENT DOCUMENTS

| | | | |
|---|---|---|---|
| 3,444,748 | A | 5/1969 | Sutaruk |
| 3,498,431 | A | 3/1970 | Sutaruk |
| 3,749,214 | A | 7/1973 | Leichliter |
| 3,752,279 | A | 8/1973 | Briar |
| 3,757,914 | A | 9/1973 | Elmer |
| 4,046,239 | A | 9/1977 | Tinholt |
| 4,246,995 | A | 1/1981 | Gee |
| 4,271,945 | A | 6/1981 | Budinski |
| 4,362,226 | A | 12/1982 | Gee |
| 4,434,883 | A * | 3/1984 | Raines ............... F16D 25/0635 403/365 |
| 4,526,257 | A | 7/1985 | Mueller |
| 4,556,138 | A | 12/1985 | Martin et al. |
| 4,692,053 | A | 9/1987 | Sampedro |
| 4,727,969 | A | 3/1988 | Hayashi et al. |
| 4,893,703 | A | 1/1990 | Kennedy et al. |
| 4,987,986 | A | 1/1991 | Kennedy et al. |
| 5,152,383 | A | 10/1992 | Boyer et al. |
| 5,511,643 | A | 4/1996 | Brown |
| 5,560,462 | A | 10/1996 | Gustin |
| 5,799,765 | A * | 9/1998 | Ono ................... F16D 35/027 192/82 T |
| 5,893,442 | A | 4/1999 | Light |
| 5,992,594 | A | 11/1999 | Herrle et al. |
| 6,021,747 | A | 2/2000 | Gee et al. |
| 6,056,098 | A | 5/2000 | Brown et al. |
| 6,370,776 | B1 | 4/2002 | Kanemitsu et al. |
| 6,419,064 | B1 | 7/2002 | Krammer |
| 6,443,283 | B1 | 9/2002 | Augenstein et al. |
| 6,481,390 | B1 | 11/2002 | Robb |
| 6,695,113 | B2 | 2/2004 | Lutz |
| 6,935,478 | B2 | 8/2005 | Dräger et al. |
| 7,083,032 | B2 | 8/2006 | Boyer |
| 7,191,883 | B2 | 3/2007 | Angermaier |
| 7,278,524 | B2 | 10/2007 | Boyer |
| 7,828,529 | B2 | 11/2010 | Baumgartner et al. |
| 7,854,307 | B2 | 12/2010 | Hennessy et al. |
| 7,913,825 | B2 | 3/2011 | Boyer |
| 7,913,826 | B2 | 3/2011 | Boyer |
| 7,938,240 | B2 | 5/2011 | Hennessy et al. |
| 7,946,400 | B2 | 5/2011 | Hennessy et al. |
| 7,954,616 | B2 | 6/2011 | Buchholz |
| 7,980,373 | B2 | 7/2011 | Boyer |
| 8,100,241 | B2 | 1/2012 | Hennessy et al. |
| 8,186,494 | B2 | 5/2012 | Boyer |
| 8,596,438 | B2 | 12/2013 | Boyer |
| 8,616,357 | B2 | 12/2013 | Boyer |
| 8,881,881 | B2 | 11/2014 | Gevers et al. |
| 8,893,868 | B2 | 11/2014 | Kennedy |
| 8,991,581 | B2 | 3/2015 | Yamada et al. |
| 9,316,272 | B1 | 4/2016 | Gwin |
| 9,664,239 | B2 | 5/2017 | Kubota et al. |
| 9,903,423 | B2 | 2/2018 | Sorg |
| 10,557,508 | B2 * | 2/2020 | Hennessy ............ F16D 35/005 |
| 2002/0014804 | A1 | 2/2002 | Nelson et al. |
| 2003/0159894 | A1 | 8/2003 | Novak |
| 2007/0205071 | A1 | 9/2007 | Light |
| 2012/0279820 | A1 | 11/2012 | Hennessy |
| 2013/0037371 | A1 | 2/2013 | Yamada |
| 2014/0209180 | A1 | 7/2014 | Boyer |
| 2015/0330463 | A1 | 11/2015 | Kubota et al. |
| 2016/0108975 | A1 | 4/2016 | Gwin |
| 2017/0138459 | A1 | 5/2017 | Tembreull et al. |

FOREIGN PATENT DOCUMENTS

| | | |
|---|---|---|
| DE | 1011528 A1 | 10/1991 |
| EP | 3350585 B1 | 4/1993 |
| JP | 2015-218838 A | 12/2015 |
| KR | 1020020044468 A | 6/2002 |
| WO | 2004051107 A2 | 6/2004 |
| WO | 2009030574 A1 | 3/2009 |
| WO | 2014004335 A1 | 1/2014 |
| WO | 2014047430 A1 | 3/2014 |
| WO | 2014158397 A1 | 10/2014 |
| WO | 2014159374 A1 | 10/2014 |
| WO | 2016187016 A2 | 11/2016 |
| WO | 2017062330 A1 | 4/2017 |
| WO | 2017082328 A1 | 5/2017 |
| WO | 2018004833 A1 | 1/2018 |
| WO | 2018057276 A2 | 3/2018 |

* cited by examiner

SHAFT OUTPUT VISCOUS CLUTCH

CROSS-REFERENCE TO RELATED APPLICATION(S)

This Application is a Section 371 National Stage Application of International Application No. PCT/US2019/024003, filed Mar. 26, 2019 and published as WO 2019/217001A1 on Nov. 14, 2019, in English, and further claims priority to U.S. Provisional Patent Application Ser. No. 62/668,997, filed May 9, 2018, the contents of each of which are hereby incorporated by reference in their entirety.

FIELD

Embodiments of the present invention relate generally to viscous clutches, as well as associated methods.

BACKGROUND

There are several alternatives available to allow for controllability of torque output from a motor or the like. For example, a variable frequency drive (VFD) can be used with an electric motor. The VFD effectively changes the frequency of the alternating current (AC) power delivered to the electric motor. The motor speed is directly linked to the frequency of the AC power. VFDs are relatively complex to install and operate, particularly in a harsh environment. For instance, the VFD power electronics are sensitive to heat and moisture, making them difficult and expensive to protect in outdoor and harsh operating environments. In many cases, VFD's are not employed due to these complexities and limitations.

Friction clutches have been used for a long time to connect and disconnect rotating processes from their respective rotating input power sources. Friction clutches are a good choice when the process can benefit from being disconnected for substantial periods of time. When a process needs to be connected frequently or when a reduced (but non-zero) output speed would be beneficial, friction clutches are often not a preferred choice. This is due to the substantial wear on the friction material and mating surfaces that results in reliability concerns and relatively high maintenance costs.

Variable speed clutches are used in a variety of applications for controlling an output speed of rotating equipment. For example, viscous (or fluid friction) clutches have been successfully deployed in automotive applications to drive cooling fans and pumps, among other uses. Examples of viscous clutches are disclosed in commonly-assigned PCT Published Applications WO2018/057276 and WO2011/062856. Viscous clutches are desirable because they are able to control an output torque over a wide speed range. They are also desirable due to the use of a shearing fluid as the torque transfer means. The shearing fluid has a long service and life and is generally maintenance-free. However, stationary (i.e., non-rotating) mounting brackets used with many viscous clutches can undesirably add mass, occupy large amounts of space, and limit mounting locations for the associated clutch. Moreover, there is a need to provide a configuration with a shaft output at the mounting location of the clutch, rather than spaced from the clutch as disclosed in WO2018/057276, while maintaining ease of installation. A convenient way of monitoring clutch output and/or input speed is also desired, while maintaining easy access to a belt, chain or the like that transfers torque to the clutch.

It is therefore desired to provide a viscous clutch with an alternative configuration.

SUMMARY

In one aspect, a viscous clutch includes a housing, an input device, a rotor, a working chamber, a reservoir, a valve, and a quick disconnect bushing. The housing can have a base, a cover, and a housing hub connected in a rotationally fixed configuration so as to rotate together. The input device can be a pulley, a sprocket, and/or a gear rotationally fixed to the housing. The rotor can have a rotor disk, a rotor hub, and a central opening. The rotor disk and the rotor hub are connected in a rotationally fixed configuration so as to rotate together, and the central opening extends entirely through the rotor hub. The working chamber is arranged between the housing and the rotor disk. The reservoir can hold a supply of a shear fluid, and is fluidically connected to the working chamber by a fluid circuit. The reservoir can be carried by the housing and can be arranged to overlap the input device in an axial direction. The valve is actuatable to selectively control a flow of the shear fluid between the reservoir and the working chamber along the fluid circuit such that a torque coupling between the housing and the rotor disk is selectively created based upon a volume of the shear fluid present in the working chamber. The quick disconnect bushing can be removably secured to the rotor hub at the central opening and can be configured so as to permit a rotationally fixed engagement between the rotor and a component driven by the viscous clutch, such as an output shaft.

In another aspect, a method of assembling a viscous clutch having a housing, a rotor, a working chamber arranged between the housing and the rotor, a reservoir to hold a supply of a shear fluid with the reservoir fluidically connected to the working chamber by a fluid circuit, and a valve, wherein the valve is actuatable to selectively control a flow of the shear fluid between the reservoir and the working chamber along the fluid circuit includes positioning a shaft in a central opening located in a rotor hub of the rotor, such that the shaft extends into the central opening from a rear side of the viscous clutch, and removably securing a quick disconnect bushing to the shaft and the rotor hub to create a rotationally fixed engagement between the rotor and the shaft.

In yet another aspect, a viscous clutch includes a housing, an input device, a rotor, a working chamber, a reservoir, a valve, a first sensor, and a second sensor. The housing can have a base, a cover, and a housing hub connected in a rotationally fixed configuration so as to rotate together. The input device can be a pulley, a sprocket, and/or a gear rotationally fixed to the housing. The rotor can have a rotor disk and a rotor hub connected in a rotationally fixed configuration so as to rotate together, and a central opening can extend entirely through the rotor hub. The working chamber can be arranged between the housing and the rotor disk. The reservoir can hold a supply of a shear fluid, and can be fluidically connected to the working chamber by a fluid circuit. The valve is actuatable to selectively control a flow of the shear fluid between the reservoir and the working chamber along the fluid circuit such that a torque coupling between the housing and the rotor disk is selectively created based upon a volume of the shear fluid present in the working chamber. The first sensor can be located rearward of the input device and configured to measure a speed of the housing. The second sensor can be located rearward of the input device and configured to measure a speed of the rotor.

The present summary is provided only by way of example, and not limitation. Other aspects of the present invention will be appreciated in view of the entirety of the present disclosure, including the entire text, claims and accompanying figures.

Figure 1:
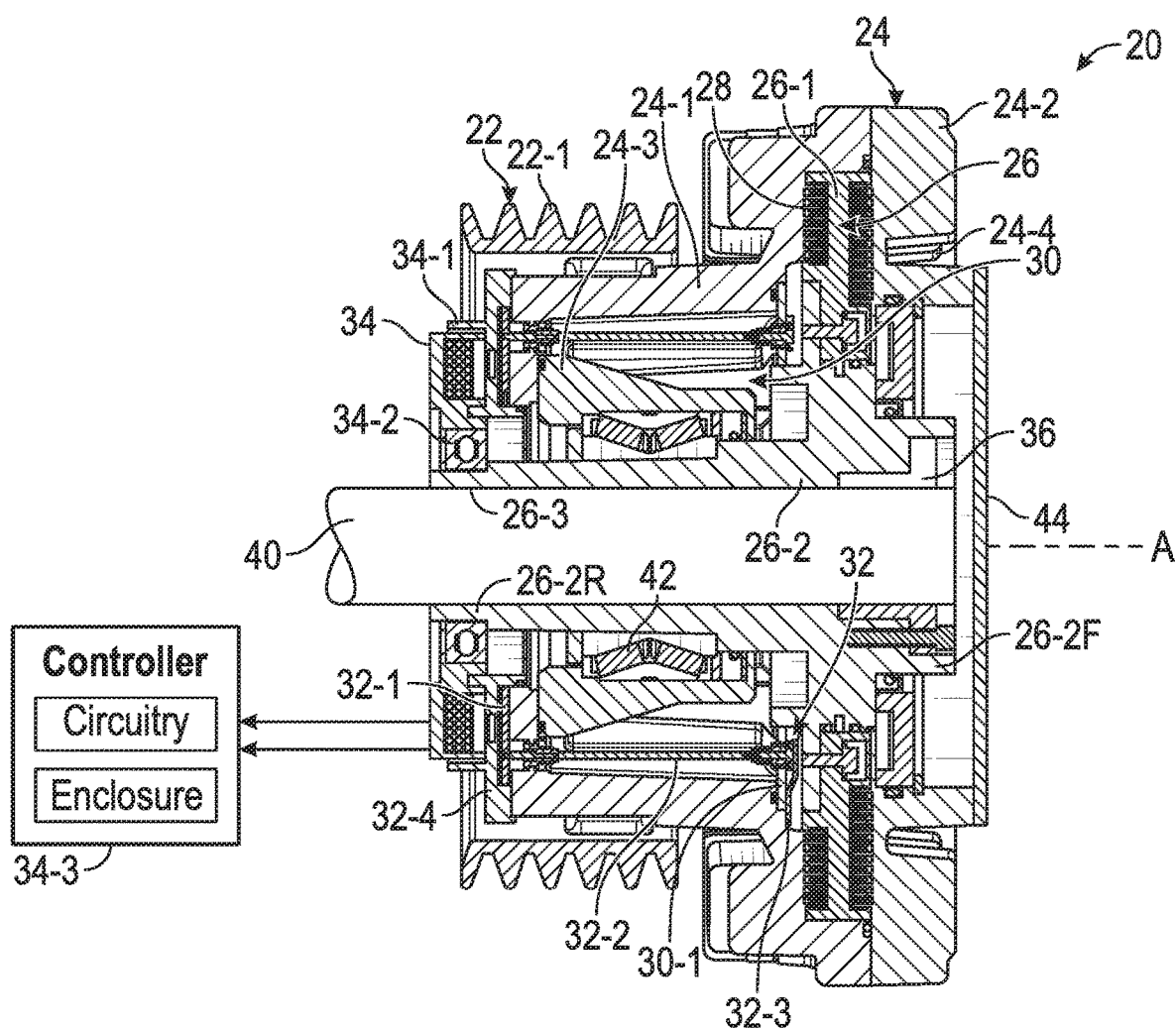
FIG. 1 is a cross-sectional view of an embodiment of a viscous clutch according to the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In general, the present invention provides a viscous clutch that allows for a torque input and output to be located on the same side of the clutch, and associated methods of assembling and using such a clutch. In some embodiments, a reservoir can be located on an input to the clutch, so as to rotating whenever there is a torque input. Additionally, in some embodiments a quick disconnect (QD) bushing or other securing mechanism can be provided to allow a relatively easy connection and disconnection of the viscous clutch to a shaft. Additionally, or in the alternative, in some embodiments, one or more speed sensors can be provided that sense an input and/or output speed associated with the viscous clutch. Embodiments according to the present invention can provide a viscous clutch that is relatively compact (particularly in an axial direction), relatively low in mass, and that is relatively easy to install and remove, while also providing relatively easy access to replace a dive belt, chain or the like while still installed. Persons of ordinary skill in the art will appreciate numerous other advantages and benefits in view of the entirety of the present disclosure, including the accompanying figures.

The present application is based on and claims the benefit of U.S. provisional patent application Ser. No. 62/668,997, filed May 9, 2018, the content of which is hereby incorporated by reference in its entirety.

Figure 2:
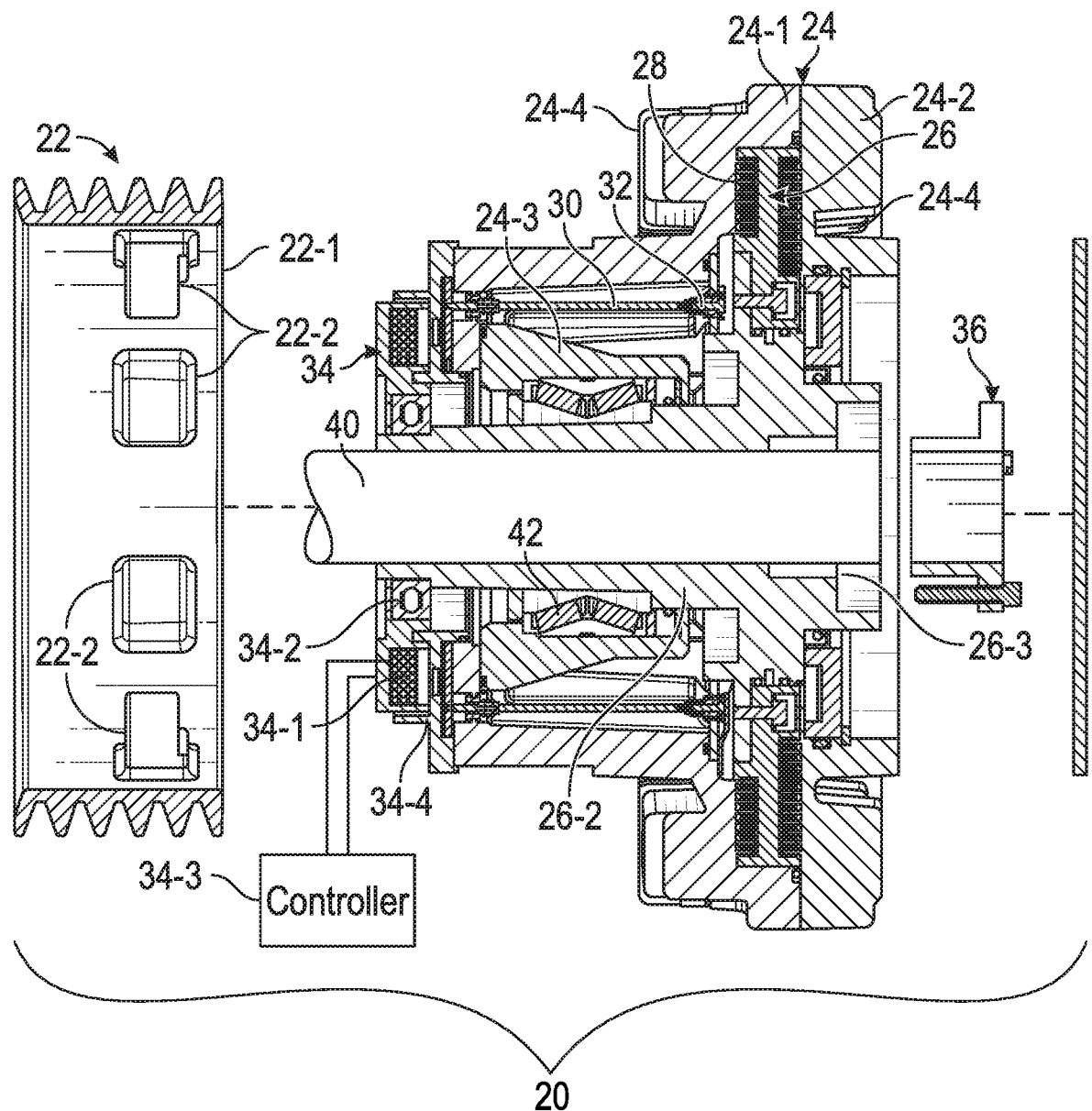
FIG. 2 is an exploded cross-sectional view of the viscous clutch of FIG. 1.

FIG. 1 is a cross-sectional view of an embodiment of a viscous clutch 20 (also referred to simply as clutch 20) that includes an input device 22, a housing 24, a rotor 26, a working chamber 28, a reservoir 30, a valve assembly 32, a control coil assembly 34 (including an electromagnetic coil 34-1), and a QD bushing 36 that functions as a securing mechanism. The viscous clutch 20 is configured to rotate about an axis A. FIG. 2 is an exploded cross-sectional view of the viscous clutch 20.

The input device 22 is removably connected to and rotationally fixed to the housing 24 in the illustrated embodiment, and rotates with the housing 24 at all times. A prime mover (not shown in FIGS. 1 and 2), such as an electric motor, internal combustion engine, or the like, can generate torque that is delivered to the input device 22 through a belt, chain, or the like during operation. The amount of input torque can vary over time, by intent (e.g., as a result of motor throttling) and/or as a result of unintended fluctuations. In the illustrated embodiment, the input device 22, which accepts torque input, is a pulley (or sheave) configured to accept torque input from a belt (not shown in FIGS. 1 and 2), and includes a body 22-1 and multiple lugs 22-2. The body 22-1 as shown is generally annular and is configured to directly engage the belt. The lugs 22-2 protrude from the body 22-1, and in the illustrated embodiment are generally equally circumferentially spaced and extend radially inward from the body 22-1. The input device 22 can be removably affixed to the housing 24 (e.g., to the base 24-1) at the lugs 22-2, such as with suitable fasteners. As shown in FIGS. 1 and 2, at least a portion of the body 22-1 is spaced from the housing 24 by the lugs 22-2 such that cooling airflow can pass between the body 22-1 and the housing 24 (e.g., near the reservoir 30) in between the lugs 22-2. In further embodiments, the input device 22 can be a sprocket that accepts torque from a chain, a gear that accepts torque from another gear, or another suitable type of input device. Using a gear, sprocket, pulley or the like as the input device 22 allows a process speed (that is, clutch output speed) to be tailored using a transmission ratio established through the number of teeth on a sprocket or gear or with a diameter of a pulley or gear. Because the input device 22 (sprocket, gear, pulley, etc.) is removable from the remainder of the clutch 20, a relatively high degree of application flexibility is provided, and the same basic clutch 20 can be easily adapted to a variety of uses by simply swapping the input device 22 for a different size or type. The input device 22 can in this way be configured to rotate at a desired speed for a given torque input from a prime mover, thereby allowing the input speed to the viscous clutch 20 to be adjusted as desired for particular applications.

The housing 24 includes a base 24-1, a cover 24-2, and a housing hub 24-3. The base 24-1 and the cover 24-2 are attached together to form an enclosure or shell of the clutch 20, and are located at an exterior of the clutch 20. One or more interior surfaces of the base 24-1 and/or cover 24-2 can include a number of ribs and grooves to increase a surface area exposed to the working chamber 28. Because torque transmission is achieved by the clutch 20 via shearing of a viscous shear fluid in the working chamber, there is heat generated in the shear fluid that needs to be dissipated to atmosphere. External surfaces of the base 24-1 and/or the cover 24-2 can include cooling fins 24-4 to facilitate heat dissipation to ambient air. As shown in the illustrated embodiment, the cover 24-2 includes a radially outward portion and a radially inner spacer portion that are secured tougher in a rotationally fixed relationship. In further embodiments, the cover 24-2 can be made as a single integral and monolithic piece, or have other suitable configurations. In the illustrated embodiment, the housing hub 24-3 is attached to the base 24-1 at an interior of the clutch 20 at a generally rearward portion of the base 24-1, and extends axially forward toward the cover 24-2. The housing hub 24-3 can alternatively be integrally and monolithically formed with the base 24-1. Further, in the illustrated embodiment, the housing hub 24-3 is located at a radially inward portion of the housing 24, near the axis A, and tapers in the axial direction from a rear end toward a forward end. The housing hub 24-3 is also located radially inward of the reservoir 30 in the illustrated embodiment. As shown in FIGS. 1 and 2, the housing 24 is configured as the driving (or input) mechanism of the viscous clutch 20, along with the input device 22. In this way, the housing 24 of the illustrated embodiment rotates at all times at the full rotational speed of the input device 22 whenever there is a torque input to the clutch 20. The full speed rotation of the housing 24 helps increase heat transfer to cool the clutch 20, because convective heat transfer is related to a velocity of ambient cooling air over the housing 24 (including the cooling fins 24-4).

The rotor 26 in the illustrated embodiment includes a rotor disk 26-1 and a rotor hub 26-2 having a central opening 26-3. The rotor disk 26-1 and the rotor hub 26-2 are rotationally fixed to each other so as to rotate together. The rotor disk 26-1 can be positioned within the housing 24 formed by the base 24-1 and the cover 24-2, and can extend in generally the radial direction. At least a portion of the rotor disk 26-1 adjoins the working chamber 28, and can include a number of ribs and grooves on one or both sides to increase the surface area exposed to the working chamber 28. The ribs and grooves of the rotor disk 26-1 can be interspersed with corresponding ribs and grooves on the housing 24. One or more openings (not specifically shown in FIGS. 1 and 2) can be provided in the rotor disk 26-1 to allow shear fluid present in the working chamber 28 to pass between opposite sides of the rotor disk 26-1. In the illustrated embodiment, the rotor hub 26-2 includes a first portion 26-2R and a second portion 26-2F. The first portion 26-2R extends axially rearward relative to the rotor disk 26-1 and can be substantially cylindrical in shape. In the illustrated embodiment, the first portion 26-2R is located at a radially inward region of the rotor 26 near the axis A, and is located radially inward of the housing hub 24-3 in a concentric relationship while overlapping the housing hub 24-3 in the axial direction. Further, in the illustrated embodiment the first portion 26-2R extends axially rearward beyond both the base 24-1 of the housing 24 and the input device 22. The second portion 26-2F extends axially forward relative to the rotor disk 26-1, in a direction opposite from the first portion 26-2R, and can be substantially cylindrical in shape. In the illustrated embodiment, the second portion 26-2F is axially shorter than the first portion 26-2R and does not extend axially beyond the cover 24-2 of the housing 24. The central opening 26-3 is located at the axis A and extends axially through the entire rotor hub 26-2, exposing the central opening 26-3 at a rear end of the first portion 26-2R and at a front end of the second portion 26-2F. The central opening 26-3 is configured to accept both a shaft 40 and a securing mechanism (e.g., QD bushing 36), as explained further below. For instance, the central opening 26-3 can further include one or more regions at the second portion 26-2F of the rotor hub 26-2 that are enlarged or otherwise specifically shaped to accept and engage the QD bushing 36.

Bearings 42, which are shown in the illustrated embodiment as one set of tapered roller bearings, are positioned in between the housing hub 24-3 and the rotor hub 26-2. The bearings 42 thereby allow the housing hub 24-3 to be rotationally supported on the rotor hub 26-2, with the base 24-1 and cover 24-2 of the housing 24 cantilevered relative to the housing hub 24-3, and allow relative rotation between the housing 24 and the rotor 26. In this way the bearings 42 allow the rotor 26 to rotate at a different speed than the housing 24, depending upon the selected degree of engagement (or slip speed) of the clutch 20. The bearings 42 can be substantially axially aligned with the input device 22. Moreover, the bearings 42 are located radially inward from and axially aligned with the reservoir 30 in the illustrated embodiment. Other types of bearings (e.g., conventional non-tapered roller bearings, needle bearings, double row ball bearings, etc.) can be used in further embodiments. Moreover, any suitable number of bearing sets can be used, as desired for particular applications. Gaps between the housing 24 and the rotor 26 can be blocked with suitable seal elements.

The working chamber 28 is defined between the housing 24 and the rotor 26. Ribs and grooves can be provided along the housing 24 and the rotor 26, as previously discussed, in order to increase the surface area along the working chamber 28. During operation, the presence of a shear fluid (e.g., silicone oil) in the working chamber 28 creates a fluid friction shear coupling to transmit torque from the housing 24 (input) to the rotor 26 (output). A degree of coupling between the housing 24 and the rotor 26 varies as a function of an amount (that is, volume) of the shear fluid present in the working chamber 28. In this way, varying the amount of the shear fluid present in the working chamber 28 allows selective control of the clutch 20, to vary the torque transmission and a rotational speed of the rotor 26.

The reservoir (or storage chamber) 30 can hold a supply of the shear fluid not needed in the working chamber 28. In the illustrated embodiment, the reservoir 30 is carried by and/or in the housing 24. More particularly, in the illustrated embodiment the reservoir 30 is carried by and at least partially bounded by the base 24-1 and the housing hub 24-3, with the reservoir 30 positioned to the rear side of the rotor disk 26-1. A reservoir cover 30-1 can further be provided at a boundary of the reservoir 30, to help retain the shear fluid therein. In the illustrated embodiment, the reservoir cover 30-1 is a plate-like wall attached to the base 24-1 near the rotor disk 26-1. The location of the reservoir in the housing 24, which acts as the input of the clutch 20, allows the reservoir to rotate whenever there is a torque input to the clutch 20. When the clutch 20 is disengaged, but a torque input is provided to the clutch 20 via the input device 22, the shear fluid is still spinning at relatively high speed and under pressure in the reservoir 30. Thus, when actuation of the clutch 30 is required, there is significant pressure available to force the shear fluid into the working area 28 quickly, which allows for relatively fast clutch response. The reservoir 30 can also be contained in the housing 24 which forms an outer shell of the clutch 20. Because torque transmission is achieved via the frictional shearing of the shear fluid, there is heat generated in the shear fluid that needs to be dissipated to atmosphere. The full input speed rotation of the housing 24 allows for efficient heat transfer, as the velocity of the air over the housing 24 is related to the ability to convectively transfer heat. Thus, because the shear fluid is stored in the reservoir 30 near the outside or exterior of the clutch 20, the shear fluid is in closer proximity to relatively cool ambient air allowing the heat transfer a direct and relatively short path to conduct through the housing 24 (including and cooling fins 24-4) to the outside of the clutch 20. Additionally, in the illustrated embodiment, the reservoir 30 is located at the rear side of the clutch 20, substantially axially aligned with the input device 22 (e.g., pulley), and is located radially inward from the input device 22. The illustrated arrangement of the reservoir 30 thus allows for a relatively axially compact clutch 20, while still allowing cooling air to flow near the reservoir 30 (e.g., allowing the reservoir to remain near an exterior of the clutch 20) and to pass between the input device 22 and the reservoir 30.

A fluid circuit is defined by the viscous clutch 20, including a fluid delivery path that extends from the reservoir 30 to the working chamber 28, and a fluid return path that extends from the working chamber 28 back to the reservoir 30. In the illustrated embodiment, the fluid delivery path passes through a bore in the reservoir cover 30-1 and the fluid return path extends radially through the rotor disk 26-1, similar to the fluid circuit disclosed in commonly-assigned PCT Patent Application Pub. No. WO2014/047430A1, though other arrangements are possible in further embodiments. In alternative embodiments, the fluid return path can be defined in the housing 24, for example. A pump element along the working chamber 28 can continually pump the shear fluid back to the reservoir 30 when there is a torque input to the clutch 20, such as in a manner known in the art.

The valve assembly 32 (which may also be referred to simply as valve 32) can be an electromagnetically-actuated valve assembly that regulates flow of the shear fluid between the reservoir 30 and the working chamber 28, thereby controlling the degree of engagement of the clutch and an associated clutch output speed. In the illustrated embodiment, the valve assembly 32 is positioned at a rear side of the clutch 20, proximate the control coil assembly 34. The valve assembly 32 in the illustrated embodiment includes a movable (e.g., axially translatable or pivotal) armature 32-1, a control rod 32-2, a valve element 32-3, and a flux guide (or flux ring) 32-4. The valve assembly 32 can control flow of the shear fluid along the delivery path (or at another point along the fluid circuit in alternative embodiments). For instance, movement of the armature 32-1 can translate the control rod 32-2, which in turn can axially pivot or translate the valve element 32-3 to selectively cover or uncover (that is, selectively obstruct or open) part of the fluid circuit. The control rod 32-2 allows the valve element 32-3 to be spaced a significant distance from the armature 32-1 but still moved in response to actuation of the armature 32-1. In one embodiment, actuation of the valve assembly 32 can be similar to that described in commonly-assigned PCT Patent Application Pub. No. WO2014/047430A1, and can cover and uncover an outlet bore in the reservoir cover 30-1. However, it should be noted that the particular configuration of the valve assembly 32 disclosed herein is provided merely by way of example and not limitation. The valve assembly 32 can be actuated by the control coil assembly 34, which is described further below. Because the valve assembly 32 can be carried by the housing 24 (e.g., by the base 24-1) on a rear side of the clutch 20, and can further be located entirely on the rear side of the rotor disk 26-1 in close proximity to the electromagnetic coil 34-1, a relatively short magnetic flux circuit can operatively link the electromagnetic coil 34-1 of the control coil assembly 34 with the valve assembly 32. Such a flux circuit need not pass through any walls of the housing 24 or the rotor 26, which can avoid the need for flux conducting inserts to pass through structures like the base 24-1 or the rotor disk 26-1 that are typically made from non-magnetic flux conducting (or simply poorly flux conductive) materials like aluminum, which otherwise have desirable mass and thermal conductivity properties. Yet the relatively small flux guide 32-4 can be positioned in between and directly adjacent to the armature 32-1 and the electromagnetic coil 34-1, with a suitable shape to accommodate generally radial air gaps separating the rotationally fixed electromagnetic coil 34-1. In this respect, the flux circuit can be external to both the housing 24 (including the base 24-1 and the cover 24-2) and the rotor 26 (including the rotor disk 26-1). The control rod 32-2 can also be located outside or independent from the flux circuit. This allows the electromagnetic coil 34-1 to be relatively small and lightweight, due to operability of the armature 32-1 of the valve assembly 32 with relatively small (that is, low intensity) magnetic fields. In alternate embodiments, a thermally-sensing bi-metal controlled valve or a direct electrically-actuated valve can be used instead of the electromagnetically-actuated valve 32 (and the electromagnetic coil 34-1 and other control coil assembly 34 components omitted).

The control coil assembly 34 as shown in the illustrated embodiment includes electromagnetic coil (or control coil) 34-1 and a coil bearing 34-2. The control coil assembly 34 is generally rotationally fixed, while the coil bearing 34-2 allows an adjacent component supporting the assembly 34 to rotate independently. A controller 34-3 with suitable control circuitry can further be provided to govern the selective energization of the electromagnetic coil 34-1, and, in turn, the output speed of the clutch 22 to a desired target speed. The electromagnetic coil 34-1 can be relatively small and therefore require only a small amount of power to control operation of the valve 32 and the clutch 20 as a whole. This allows for the controller 34-3 to be relatively small as well. Because of the small amount of power needed for the electromagnetic coil 34-1, and the relatively small amount of heat generated by such relatively low power operation, electrical circuitry of the controller 34-3 can be enclosed and sealed in a protective enclosure to protect the controller 34-3 from exposure to the elements without concern for heat damage. In some embodiments, the electromagnetic coil 34-1 can be secured to and supported on the clutch 20, for instance on the rotor hub 26-2 (e.g., on the first portion 26-2R) by the coil bearing 34-2, such that mounting and engaging the clutch 20 on the output shaft 40 (or other output device) simultaneously mechanically mounts the control coil assembly 34, thereby avoiding the need to separately mount the electromagnetic coil 34-1. The control coil assembly 34 can be located at a rear side of the clutch 20, generally rearward of the input device 22. Further, the control coil assembly 34 be located at the same side of the clutch 20 as both the torque input and output. As shown in the illustrated embodiment, the electromagnetic coil 34-1 is positioned adjacent to the flux guide 32-4 of the valve assembly 32. Further, in the illustrated embodiment, the control coil assembly 34 is located at or near the rearmost portion of the clutch 20, which allows a cable (and a tether, bracket or other rotation-fixing device) to be located rearward of the input device 22 (e.g., pulley) as well as associated belts, chains, etc. that attach to the input device 22. Such a cable location facilitates removal and/or replacement of the belt, chain, etc. of the input device 22 without interference from the cable (or tether) of the control coil assembly 34, for instance.

A securing mechanism can removably attach and engage the clutch mechanism to the out shaft in a rotationally fixed manner. In the illustrated embodiment, the securing mechanism is configured as a quick detachable (QD) bushing 36. QD bushings generally have a keyed (that is, splined) engagement feature on an inner surface and a tapered outer surface (that is, a frusto-conical outer grip surface). In this way, a keyway on the securing mechanism can engage a protruding key or spline on the output shaft 40 while a tapered surface can form a tight fit against the rotor hub 26-1 (e.g., within a stepped notch of the central opening 26-3 at the second portion 26-2F). The keyway and tapered surface can each be generally located on a sleeve portion of the QD bushing 36, and a flange with openings to accept suitable fasteners (e.g., bolts, screws or the like) protrudes radially outward from the sleeve portion, typically at an end of the sleeve portion. The fasteners allow the securing mechanism to be tightly engaged with the rotor hub 26-2 (e.g., with the second portion 26-2F). The QD bushing 36 can further have a split configuration, with a split line passing through both the sleeve portion and the flange. The split line can be arranged circumferentially opposite the keyway. In alternate embodiments, another type of bushing or other suitable type of securing mechanism can be utilized.

A cap (or cover) 44 can be provided, secured to the housing 24 of the clutch 20 for co-rotation therewith in a rotationally fixed manner. The cap 44 can protect the securing mechanism (e.g., QD bushing 36) as well as a cavity in which the securing mechanism and the end of the shaft 40 are located. The cap 44 can, for instance, be a lightweight, generally planar plate removably secured to the housing 24 with suitable fasteners. Removal of the cap 44 allows for easy access to the securing mechanism. The cap 44, as well as the securing mechanism, can be located at a front side of the clutch 22 opposite from both the torque input and output, as well as generally opposite the input device 22 and the control coil assembly 34.

One or more seals can be provided to seal gaps between components that rotate relative to each other, such as to seal a gap between the housing 24 and the rotor 26. Such seals can help retain the shear fluid within the clutch 20 in a manner well known in the art.

The shaft 40 can be separate from the clutch 20. For instance, the shaft 40 can be an input shaft of an external device or process that is powered by torque output from the clutch 20. In this sense the shaft 40 accepts torque output of the clutch 20 and acts as the output. The shaft 40 can be removably inserted into the central opening 26-3 (e.g., as a "live" center output shaft), and can be engaged and rotationally fixed to the rotor 26 (e.g., to the rotor hub 26-2) by the securing mechanism (e.g., QD bushing 36). The clutch 20 can be supported on the shaft 40 in a cantilevered manner in some embodiments. In the illustrated embodiment, the shaft 40 enters the central opening 26-3 from the rear of the clutch 20 and extends entirely through the rotor hub 26-2 and the central opening 26-3. Because the shaft 40 is not a part of the clutch 20, the shaft 40 need not be part of a magnetic flux circuit to operate the valve 32 and need not have any openings to accept wires or the like.

Figure 3:
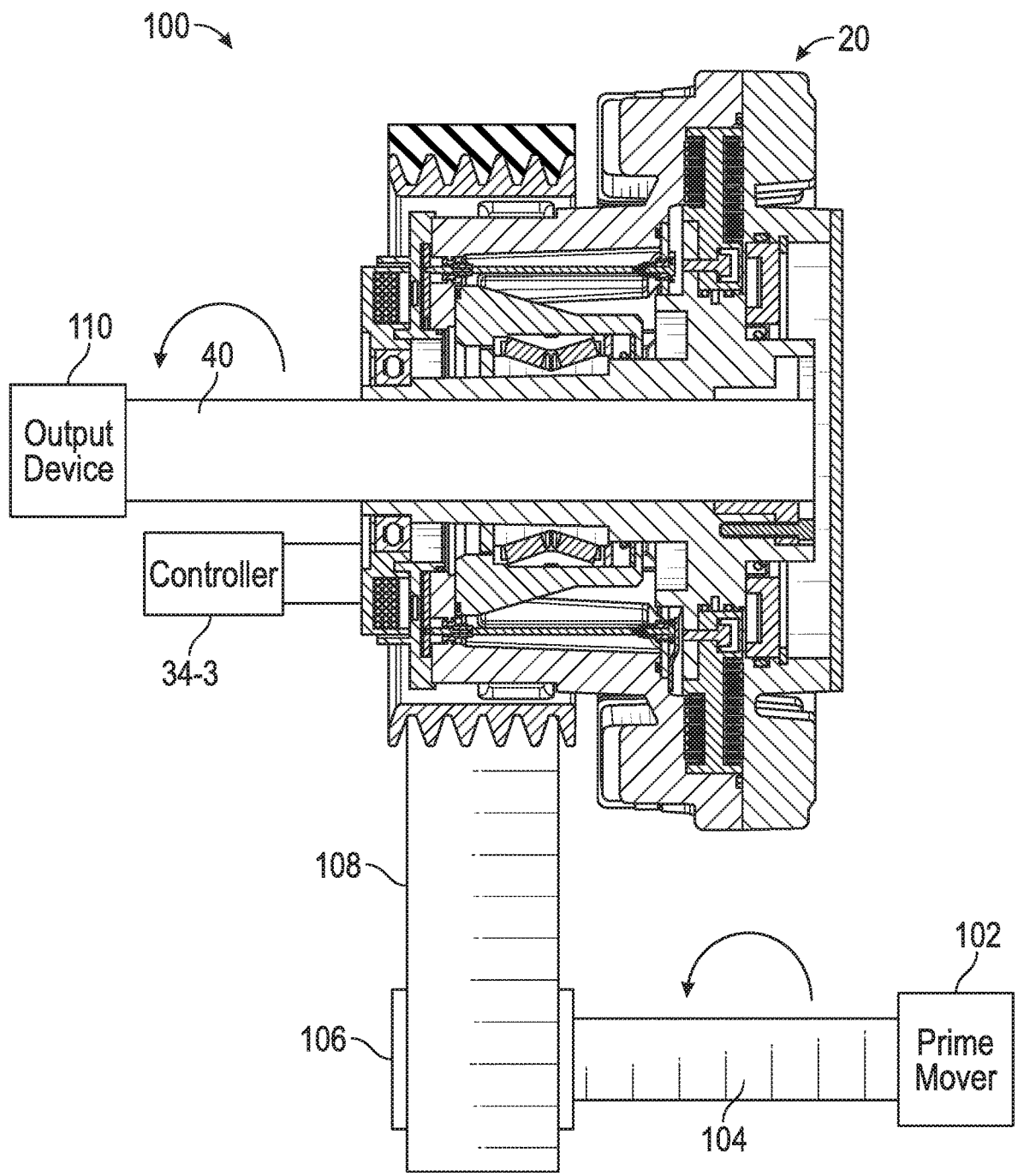
FIG. 3 is a schematic cross-sectional view of an embodiment of a torque transmission system according to the present invention utilizing the viscous clutch of FIGS. 1 and 2.

FIG. 3 is a schematic cross-sectional view of an embodiment of a torque transmission system 100 utilizing the viscous clutch 20. As shown in the illustrated embodiment, the system 100 includes the clutch 20, a prime mover 102 (e.g., a motor, engine or the like), a driveshaft 104, a pulley 106, a belt 108, the shaft 40, and an output device 110 (e.g., fan, pump, machine, or the like). The prime mover 102 generates torque, which is transmitted through the driveshaft 104 to the pulley 106 and then to the belt 108. The belt 108 transmits the torque to the input device 22 of the clutch 20 at a given input speed. The clutch 20 selectively transmits torque to the shaft 40 at a desired output speed, as governed by the controller 34-4. The shaft 40 then transmits the output toque to the output device 110 and the desired output speed. In this way, the clutch 20 allows for modulation of the rotational speed of the output device 110 largely independent of the speed of the prime mover 102. It should be noted that the configuration of the system 100 in FIG. 3 is shown merely by way of example. Numerous other configurations are possible in further embodiments, such as systems with more complex drivetrains. Moreover, instead of the pulley 106 and the belt 108, a sprocket and chain, gear and shaft assembly, or other suitable types of drivetrain components can be utilized in further embodiments.

Installation and use of the clutch system 100 can include the following steps, in some embodiments. A desired input device 22 (e.g., pulley) can be attached to a clutch 20 (e.g., at or near a rear face of the shell or housing 24). The clutch 20 (including the attached input device 22) can then be slid onto the output shaft 40 (e.g., the input shaft of an output device 110 powered by torque output from the clutch 20), which can include engaging and securing a hub 26-2 of an output member 26 (e.g., output rotor) to the output shaft 40. This securing step can include securing the hub 26-2 to the output shaft 40 in a rotationally fixed manner with a securing mechanism (e.g., a QD bushing 26 or other suitable bushing). A cap 44 is then secured over the securing mechanism. A cable can be attached to a control coil assembly 34, to transmit power and control signals between the clutch system 100 and external source(s). The control coil assembly 34 can be integrated with the clutch 20, thereby avoiding the need for a separate attachment of an electromagnetic coil 34-1 and associated structures. A belt, chain or other transmission element 108 is engaged to the input device 22 (e.g., pulley) on the input (e.g., housing 24) of the clutch 20. The belt 108, the input device 22, and the output shaft 40 can each be located on the same side (e.g., rear side) of the clutch 20 (though the output shaft 40 can pass mostly or entirely through the clutch 20). The belt 108 can in turn be coupled to suitable additional components (e.g., another pulley 106, another shaft, a prime mover, etc.) to allow torque input to the clutch 20. Likewise, the output device 110 can be connected to a drivetrain or other components that accept torque output from the clutch 20 and transmit that torque to the output device 110.

Once assembled, the clutch 20 can be operated by selectively energizing an electromagnetic coil 34-1 of a control coil assembly 34 in order to actuate a valve assembly 32. A controller 43-3 can govern the operation of the control coil assembly 34 and, in turn, the valve 32, such as by establishing a pulse width modulated (PWM) duty cycle. Actuation of the valve assembly 32 can regulate the flow of shear fluid to a working chamber 28 from a reservoir 30. The reservoir 30 can be rotated whenever there is a torque input to the clutch 20, that is, whenever the input device 22 rotates. The presence of the shear fluid in the working chamber 28 transmits torque between the input member and the output member, as a function of the amount or volume of the shear fluid present. As explained further below, feedback from a speed sensor assembly can optionally be utilized by the controller 34-3 to adjust the control of the valve 32 and the degree of engagement of the clutch 20 based on current operating conditions.

Figure 4:
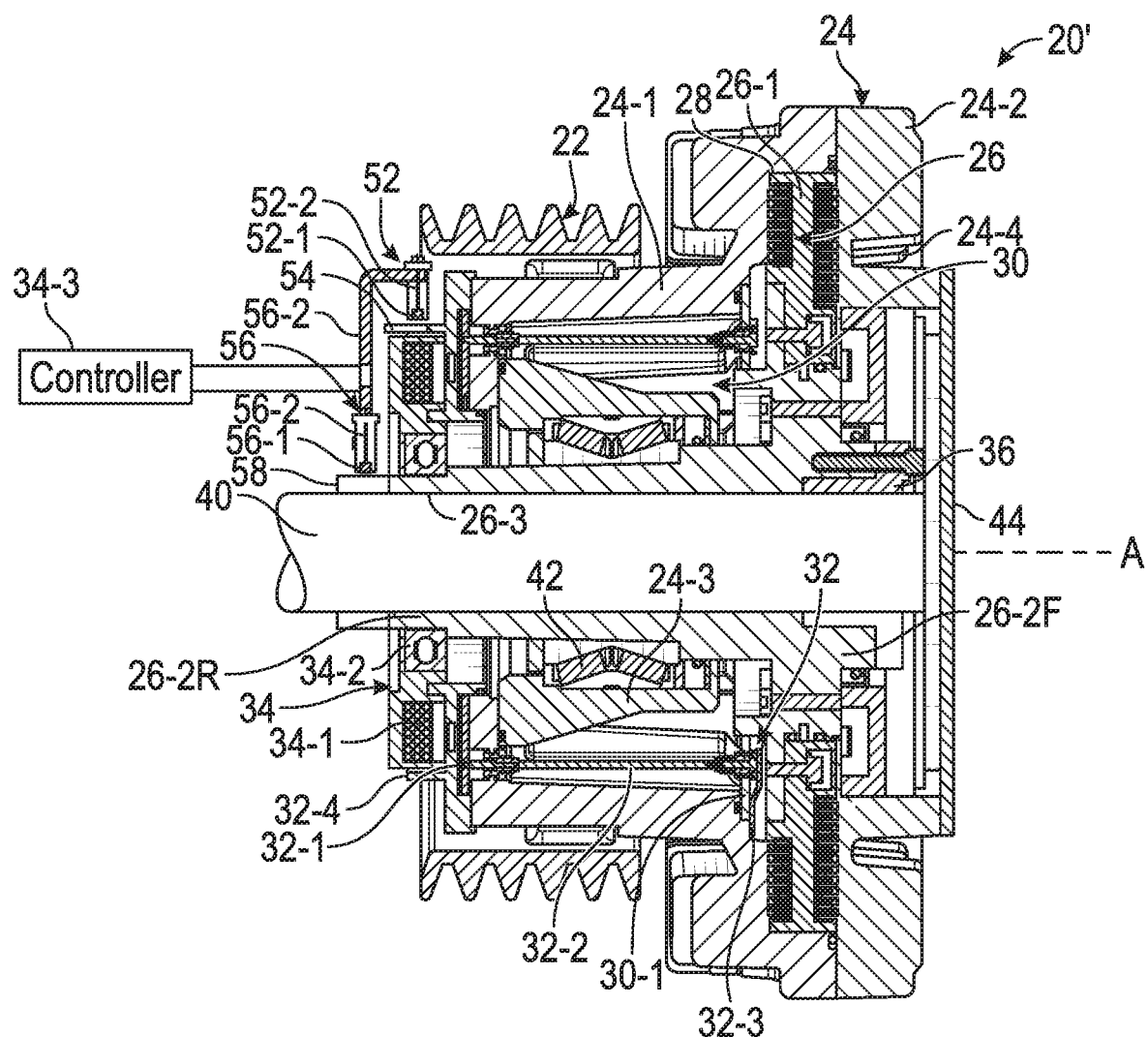
FIG. 4 is a cross-sectional view of another embodiment of a viscous clutch with a speed sensor assembly, according to the present invention.
Figure 5:
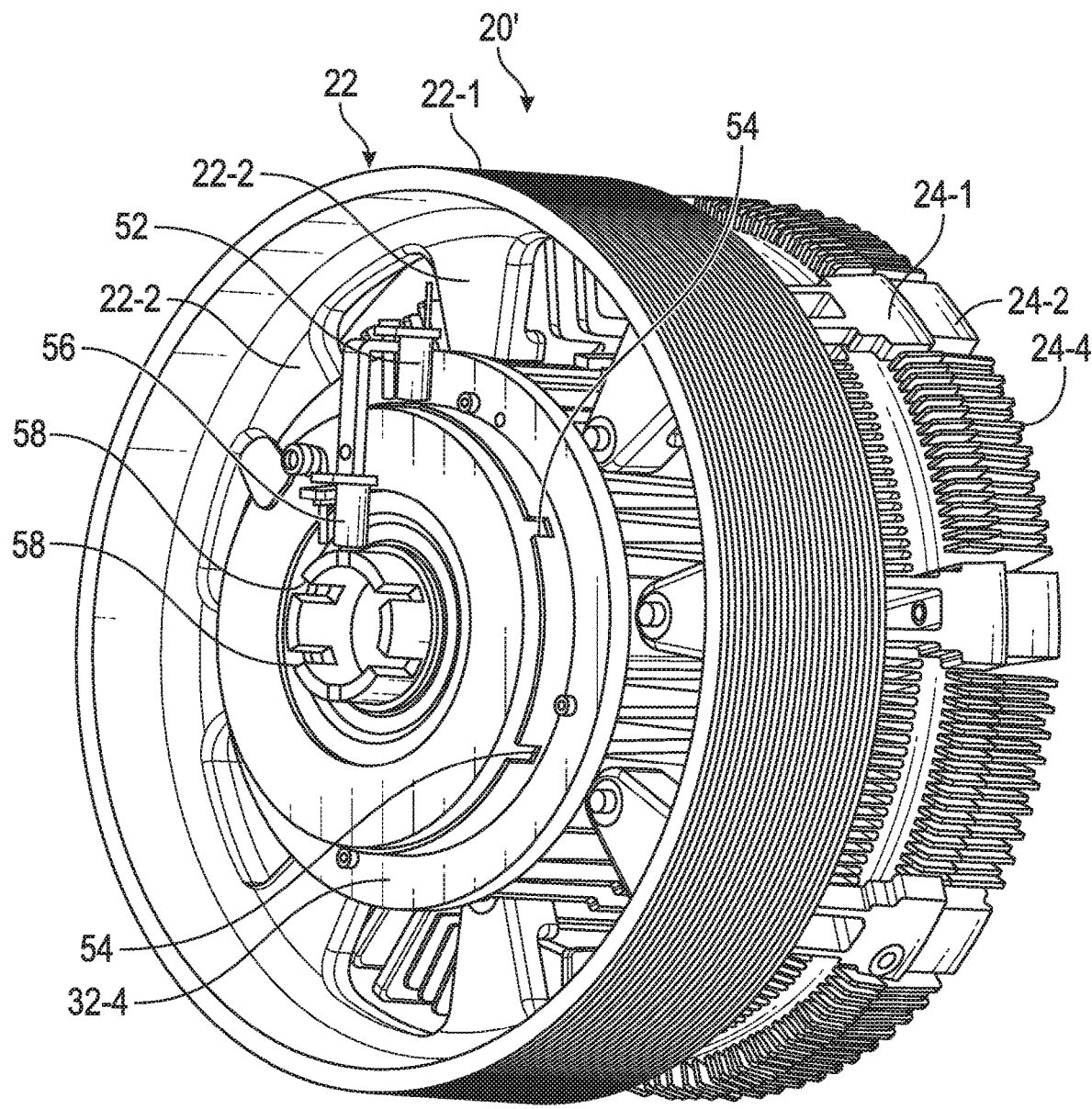
FIG. 5 is rear perspective view of the viscous clutch with the speed sensor assembly of FIG. 4.

FIGS. 4 and 5 illustrate another embodiment of a viscous clutch 20' that includes a speed sensor assembly 50. FIG. 4 is a cross-sectional view of the viscous clutch 20', and FIG. 5 is rear perspective view of the viscous clutch 20'. In general, the clutch 20' has a configuration similar to that of the clutch 20 described above, with like reference numbers identifying like parts, and adds the speed sensor assembly 50. In order to control the speed of the clutch output (e.g., the rotor 26, and, in turn, the shaft 40) relative to the clutch input (e.g., the input device 22 and the housing 24) with relatively high precision, the speed of both the input and output of the clutch 20' need to be monitored. To achieve this, the sensor assembly 50 can provide at least two sensors (e.g., Hall Effect sensors). These sensors can be secured to the clutch 20' at or near the rotationally stationary control coil assembly 34.

A first (or input) sensor 52 can be aimed at a first target 54 that is rotationally fixed relative to the input (e.g., the housing 24 and the input device 22) in order to sense a rotational speed of the clutch input. The first sensor 52 can include a Hall Effect sensor element 52-1 and a circuit board 52-2, and can be rotationally fixed to the rotationally stationary control coil assembly 34. The first target 54 can be an array or one or more notches in or on the flux guide 32-4 that co-rotates with the input (e.g., housing 24). In the illustrated embodiment, the first target 54 is an array of circumferentially spaced, generally rectangularly shaped notches that pass entirely radially through a distal end of an axially extending flange of the flux guide 32-4 located radially outward of the electromagnetic coil 34-1.

The second (or output) sensor 56 can be aimed at a second target 58 that is rotationally fixed relative to the output (e.g., the rotor 26 and, in turn, the shaft 40) in order to sense a rotational speed of the clutch output. The second sensor 56 can include a Hall Effect sensor element 56-1 and a circuit board 56-2, and can be rotationally fixed to the rotationally stationary control coil assembly 34. The second target 58 can be an array of one or more notches in or on the rotor hub 26-2 that co-rotates with the output (e.g., the rotor 26 and, in turn, the shaft 40). In the illustrated embodiment, the second target 58 is an array of circumferentially spaced, generally rectangularly shaped notches that pass entirely radially through a distal end of the first portion 26-2R of the rotor hub 26-2 located radially inward of the electromagnetic coil 34-1 (and the coil bearing 34-2) and the first sensor 52.

The use of notches to form the first and second targets 54 and 58 allows those targets 54 and 58 to be integrated into existing components (e.g., the flux guide 32-4 and the rotor hub 26-2), thereby avoiding the need to add mass and/or manufacturing/assembly complexity associated with the use of separate, additional target structures. Though in further embodiments, one or both of the first and second targets 54 and 58 can be provided as a separate disk, wheel, sleeve or the like that is rotationally fixed to desired clutch input and/or output structures.

In the illustrated embodiment, the first and second sensors 52 and 56 are both supported by a common support structure 60, which can have a generally L-shaped configuration. The support structure 60 allows the sensor assembly 50 to be installed on the control coil assembly 34 in essentially a single attachment operation, and integrally forming the targets 54 and 58 requires no further attachment operations, thus simplifying manufacturing/assembly of the clutch 20'. In further embodiments the first and second sensors 52 and 56 can be mounted separately, without a common mounting structure.

The rotational speed measurement of the first sensor 52 provides a measurement of the input speed of the clutch 20', and the rotational speed measurement of the second sensor 56 provides a measurement of the output speed of the clutch 20'. A comparison of the output speed to a desired output speed is possible with use of only the second sensor 56. However, it is further useful to measure both the input and output speeds in order to accurately control the clutch output (e.g., the rotor 26 and, in turn, the shaft 40) relative to the clutch input (e.g., the input device 22 and the housing 24). For instance, variations in input torque can be compensated for through control of the clutch 20' to provide a substantially constant output speed. In this way, unintended variations in input torque from a prime mover (see FIG. 3), whether periodic and predictable or essentially random and unpredictable, can be compensated for and smoothed out by the clutch 20', thereby helping to minimize variations in rotational speed of an output device that receives torque from the clutch 20' (see FIG. 3).

Discussion of Possible Embodiments

A viscous clutch can include a housing having a base, a cover, and a housing hub, with the base, the cover and the housing hub are connected in a rotationally fixed configuration so as to rotate together; an input device rotationally fixed to the housing, with the input device being a pulley, a sprocket, a gear, or the like; a rotor having a rotor disk, a rotor hub, and a central opening, with the rotor disk and the rotor hub connected in a rotationally fixed configuration so as to rotate together, and with the central opening extending entirely through the rotor hub; a working chamber arranged between the housing and the rotor disk; a reservoir to hold a supply of a shear fluid, the reservoir fluidically connected to the working chamber by a fluid circuit, the reservoir carried by the housing and arranged to overlap the input device in an axial direction; a valve, the valve being actuatable to selectively control a flow of the shear fluid between the reservoir and the working chamber along the fluid circuit such that a torque coupling between the housing and the rotor disk is selectively created based upon a volume of the shear fluid present in the working chamber; and a quick disconnect bushing removably secured to the rotor hub at the central opening and configured so as to permit a rotationally fixed engagement between the rotor and an output shaft.

The viscous clutch of the preceding paragraph can optionally include, additionally and/or alternatively, any one or more of the following features, configurations and/or additional components:

a first portion of the rotor hub can extend axially rearward relative to the rotor disk, in a concentric relationship with the housing hub;

a bearing can be positioned between the housing hub and the first portion of the rotor hub;

a second portion of the rotor hub can extend axially forward relative to the rotor disk;

the quick disconnect bushing can be removably secured to the second portion of the rotor hub;

a bearing that supports the housing on the rotor hub can be axially aligned with both the input device and the reservoir;

the housing hub can be located radially inward of the reservoir;

the input device can include a body and a plurality of spaced apart mounting lugs extending from the body, and the mounting lugs can be secured to the housing with at least a portion of the body spaced from the housing such that cooling airflow can pass between the body and the housing;

an electromagnetic coil, and energization of the electromagnetic coil can control operation of the valve;

a coil bearing rotationally supporting the electromagnetic coil on the rotor hub;

the input device can be positioned in between the electromagnetic coil and the rotor disk in the axial direction;

a controller that governs energization of the electromagnetic coil;

circuitry of the controller can be sealed in a protective enclosure;

a first sensor located rearward of the input device, the first sensor configured to measure an input speed of the housing;

a second sensor located rearward of the input device, the second sensor configured to measure an output speed of the rotor;

a first target connected to the base of the housing in a rotationally fixed configuration so as to rotate together, and the first sensor can be configured to sense rotation of the first target;

a second target connected to the rotor hub in a rotationally fixed configuration so as to rotate together, and the second sensor can be configured to sense rotation of the second target;

an electromagnetic coil, and energization of the electromagnetic coil can control operation of the valve; and/or the first and second sensors can both be rotationally fixed relative to the electromagnetic coil, in a direct or indirect manner.

A method of assembling a viscous clutch having a housing, a rotor, a working chamber arranged between the housing and the rotor, a reservoir to hold a supply of a shear fluid with the reservoir fluidically connected to the working chamber by a fluid circuit, and a valve, with the valve being actuatable to selectively control a flow of the shear fluid between the reservoir and the working chamber along the fluid circuit, the method can include positioning a shaft in a central opening located in a rotor hub of the rotor, with the shaft extending into the central opening from a rear side of the viscous clutch; and removably securing a quick disconnect bushing to the shaft and the rotor hub to create a rotationally fixed engagement between the rotor and the shaft.

The method of the preceding paragraph can optionally include, additionally and/or alternatively, any one or more of the following features, configurations and/or additional steps:

creating an electrical connection to an electromagnetic coil located at the rear side of the viscous clutch;

the electromagnetic coil can encircle the shaft and can be located rearward of the housing;

creating an electrical connection to a sensor located at a rear side of the viscous clutch to sense a rotational speed;

the sensor can be located rearward of the housing;

attaching a belt to a pulley that is rotationally fixed to the housing at the rear side of the viscous clutch; and/or electrical connections to the electromagnetic coil and the sensor can be made with at least one cable located rearward of the belt.

A viscous clutch can include a housing having a base, a cover, and a housing hub, where the base, the cover and the housing hub can be connected in a rotationally fixed configuration so as to rotate together; an input device rotationally fixed to the housing, with the input device being a pulley, a sprocket, a gear, or the like; a rotor having a rotor disk and a rotor hub, the rotor disk and the rotor hub can be connected in a rotationally fixed configuration so as to rotate together, and the rotor hub can have a central opening that extends entirely through the rotor hub; a working chamber arranged between the housing and the rotor disk; a reservoir to hold a supply of a shear fluid, the reservoir fluidically connected to the working chamber by a fluid circuit; a valve, actuatable to selectively control a flow of the shear fluid between the reservoir and the working chamber along the fluid circuit such that a torque coupling between the housing and the rotor disk is selectively created based upon a volume of the shear fluid present in the working chamber; a first sensor located rearward of the input device, the first sensor configured to measure a speed of the housing; and a second sensor located rearward of the input device, the second sensor configured to measure a speed of the rotor.

The viscous clutch of the preceding paragraph can optionally include, additionally and/or alternatively, any one or more of the following features, configurations and/or additional components:

a first target connected to the base of the housing in a rotationally fixed configuration so as to rotate together;

the first sensor can be configured to sense rotation of the first target;

a second target connected to the rotor hub in a rotationally fixed configuration so as to rotate together;

the second sensor can be configured to sense rotation of the second target;

an electromagnetic coil, where energization of the electromagnetic coil controls operation of the valve, and where the first and second sensors are both rotationally fixed relative to the electromagnetic coil; and/or a quick disconnect bushing removably secured to the rotor hub at the central opening and configured so as to permit a rotationally fixed engagement between the rotor and a shaft insertable into the central opening.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention.

The invention claimed is:

1. A viscous clutch comprising:
a housing having a base, a cover, and a housing hub, wherein the base, the cover and the housing hub are connected in a rotationally fixed configuration so as to rotate together;
an input device rotationally fixed to the housing, wherein the input device is selected from the group consisting of a pulley, a sprocket, and a gear;
a rotor having a rotor disk, a rotor hub, and a central opening, wherein the rotor disk and the rotor hub are connected in a rotationally fixed configuration so as to rotate together, and wherein the central opening extends entirely through the rotor hub;
a working chamber arranged between the housing and the rotor disk;
a reservoir to hold a supply of a shear fluid, the reservoir fluidically connected to the working chamber by a fluid circuit, wherein the reservoir is carried by the housing and is arranged to overlap the input device in an axial direction;
a valve, wherein the valve is actuatable to selectively control a flow of the shear fluid between the reservoir and the working chamber along the fluid circuit such that a torque coupling between the housing and the rotor disk is selectively created based upon a volume of the shear fluid present in the working chamber; and
a quick disconnect bushing removably secured to the rotor hub at the central opening and configured so as to permit a rotationally fixed engagement between the rotor and an output shaft.

2. The viscous clutch of claim 1, wherein a first portion of the rotor hub extends axially rearward relative to the rotor disk, in a concentric relationship with the housing hub, and wherein a bearing is positioned between the housing hub and the first portion of the rotor hub.

3. The viscous clutch of claim 2, wherein a second portion of the rotor hub extends axially forward relative to the rotor disk, and wherein the quick disconnect bushing is removably secured to the second portion of the rotor hub.

4. The viscous clutch of claim 1 and further comprising:
a bearing that supports the housing on the rotor hub, wherein the bearing is axially aligned with both the input device and the reservoir.

5. The viscous clutch of claim 1, wherein the housing hub is located radially inward of the reservoir.

6. The viscous clutch of claim 1, wherein the input device includes a body and a plurality of spaced apart mounting lugs extending from the body, and wherein the mounting lugs are secured to the housing with at least a portion of the body spaced from the housing such that cooling airflow can pass between the body and the housing.

7. The viscous clutch of claim 1 and further comprising:
an electromagnetic coil, wherein energization of the electromagnetic coil controls operation of the valve.

8. The viscous clutch of claim 7 and further comprising:
a coil bearing rotationally supporting the electromagnetic coil on the rotor hub.

9. The viscous clutch of claim 7, wherein the input device is positioned in between the electromagnetic coil and the rotor disk in the axial direction.

10. The viscous clutch of claim 7 and further comprising:
a controller that governs energization of the electromagnetic coil, wherein circuitry of the controller is sealed in a protective enclosure.

11. The viscous clutch of claim 1 and further comprising:
a first sensor located rearward of the input device, the first sensor configured to measure an input speed of the housing; and
a second sensor located rearward of the input device, the second sensor configured to measure an output speed of the rotor.

12. The viscous clutch of claim 11 and further comprising:
a first target connected to the base of the housing in a rotationally fixed configuration so as to rotate together, wherein the first sensor is configured to sense rotation of the first target; and
a second target connected to the rotor hub in a rotationally fixed configuration so as to rotate together, wherein the second sensor is configured to sense rotation of the second target.

13. The viscous clutch of claim 12 and further comprising:
an electromagnetic coil, wherein energization of the electromagnetic coil controls operation of the valve, and wherein the first and second sensors are both rotationally fixed relative to the electromagnetic coil.

14. A method of assembling a viscous clutch having a housing, a rotor, a working chamber arranged between the housing and the rotor, a reservoir to hold a supply of a shear fluid with the reservoir fluidically connected to the working chamber by a fluid circuit, and a valve, wherein the valve is actuatable to selectively control a flow of the shear fluid between the reservoir and the working chamber along the fluid circuit, the method comprising:
positioning a shaft in a central opening located in a rotor hub of the rotor, wherein the shaft extends into the central opening from a rear side of the viscous clutch; and
removably securing a quick disconnect bushing to the shaft and the rotor hub to create a rotationally fixed engagement between the rotor and the shaft.

15. The method of claim 14 and further comprising:
creating an electrical connection to an electromagnetic coil located at the rear side of the viscous clutch, wherein the electromagnetic coil encircles the shaft and is located rearward of the housing; and
creating an electrical connection to a sensor located at a rear side of the viscous clutch to sense a rotational speed, wherein the sensor is located rearward of the housing.

16. The method of claim 15 and further comprising:
attaching a belt to a pulley that is rotationally fixed to the housing at the rear side of the viscous clutch, wherein electrical connections to the electromagnetic coil and the sensor are made with at least one cable located rearward of the belt.

17. A viscous clutch comprising:
a housing having a base, a cover, and a housing hub, wherein the base, the cover and the housing hub are connected in a rotationally fixed configuration so as to rotate together;
an input device rotationally fixed to the housing, wherein the input device is selected from the group consisting of a pulley, a sprocket, and a gear;
a rotor having a rotor disk and a rotor hub, wherein the rotor disk and the rotor hub are connected in a rotationally fixed configuration so as to rotate together, and wherein the rotor hub has a central opening that extends entirely through the rotor hub;
a working chamber arranged between the housing and the rotor disk;
a reservoir to hold a supply of a shear fluid, the reservoir fluidically connected to the working chamber by a fluid circuit;
a valve, wherein the valve is actuatable to selectively control a flow of the shear fluid between the reservoir and the working chamber along the fluid circuit such that a torque coupling between the housing and the rotor disk is selectively created based upon a volume of the shear fluid present in the working chamber;
a first sensor located rearward of the input device, the first sensor configured to measure a speed of the housing; and
a second sensor located rearward of the input device, the second sensor configured to measure a speed of the rotor.

18. The viscous clutch of claim 17 and further comprising:
- a first target connected to the base of the housing in a rotationally fixed configuration so as to rotate together, wherein the first sensor is configured to sense rotation of the first target; and
- a second target connected to the rotor hub in a rotationally fixed configuration so as to rotate together, wherein the second sensor is configured to sense rotation of the second target.

19. The viscous clutch of claim 18 and further comprising:
- an electromagnetic coil, wherein energization of the electromagnetic coil controls operation of the valve, and wherein the first and second sensors are both rotationally fixed relative to the electromagnetic coil.

20. The viscous clutch of claim 17 and further comprising:
- a quick disconnect bushing removably secured to the rotor hub at the central opening and configured so as to permit a rotationally fixed engagement between the rotor and a shaft insertable into the central opening.

* * * * *